United States Patent
Ng et al.

(10) Patent No.: US 7,688,476 B2
(45) Date of Patent: Mar. 30, 2010

(54) APPARATUS AND METHOD FOR PRINTING VALIDATED IMAGE DATA IN A NOISY ENVIRONMENT

(75) Inventors: Yee S. Ng, Fairport, NY (US); Shawn E. O'Hara, Rochester, NY (US); Robert P. Dutt, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 1364 days.

(21) Appl. No.: 11/027,594

(22) Filed: Jan. 3, 2005

(65) Prior Publication Data

US 2006/0146374 A1 Jul. 6, 2006

(51) Int. Cl.
*H04N 1/04* (2006.01)
(52) U.S. Cl. .............. 358/437; 358/1.14; 358/426.1; 358/474
(58) Field of Classification Search .......... 358/474, 358/471, 400, 437, 1.14, 426.1, 405, 406; 370/278, 277, 276; 455/577, 550.1, 73; 382/234, 382/232
See application file for complete search history.

(56) References Cited

U.S. PATENT DOCUMENTS

| | | | | |
|---|---|---|---|---|
| 4,325,085 A | * | 4/1982 | Gooch | ............ 382/234 |
| 4,829,524 A | | 5/1989 | Yoshida | ............ 371/32 |
| 4,887,162 A | * | 12/1989 | Arai | ............ 358/400 |
| 5,050,004 A | * | 9/1991 | Morton, Jr. | ............ 358/405 |
| 5,233,653 A | * | 8/1993 | Katsurabayashi | ............ 380/243 |
| 5,282,238 A | * | 1/1994 | Berland | ............ 455/557 |
| 6,088,050 A | | 7/2000 | Ng | ............ 347/237 |
| 7,388,681 B2 | * | 6/2008 | Prakash | ............ 358/1.14 |
| 2002/0154321 A1 | | 10/2002 | Pham et al. | ............ 358/1.8 |
| 2004/0024907 A1 | | 2/2004 | Chapman et al. | ............ 709/248 |

* cited by examiner

*Primary Examiner*—Houshang Safaipour
(74) *Attorney, Agent, or Firm*—Larry P. Kessler; Donna P. Suchy

(57) ABSTRACT

A method and apparatus for transmitting and receiving image data and control characters across an interface that is subject to noise for output to a printer. The image data and the control characters are transmitted across the interface to a receiver device. A determination is made as to whether or not a line of image data has been sufficiently transferred to the receiver device and, if the current line of image data has not been sufficiently transferred, there is provided for output to the printer a prior sufficiently received line of image data in replacement of the current line of image data so that the prior line of image data is printed at least twice in succession.

22 Claims, 15 Drawing Sheets

APPARATUS AND METHOD FOR PRINTING VALIDATED IMAGE DATA IN A NOISY ENVIRONMENT

FIELD OF THE INVENTION

The present invention is related to the field of digital communications and is more particularly related to the field of providing validated image data across an interface in a noisy environment to a printer device.

BACKGROUND OF THE INVENTION

For high-speed data communication over a communication link between a digital front-end and an electronic writer located inside a hostile environment (from an EMI sense), such as in an electrophotographic printer, sparking of high-voltage chargers either due to contamination on the charger itself or due to hole formation on the photosensitive drum can cause image data corruption and image artifacts on the prints. Typically printing systems stop verifying the integrity of the control signals and image data at the output of the digital front-end. As the speed of the printer goes up, the exposure control and image integrity become more critical and are more susceptible to corruption. As noted in U.S. Patent Publication No. 2004/0024907, to improve the reliability of data transmitted in a high-speed communications link under a hostile environment redundant control words per line may be used in the transmitted data to ensure that the start of line signal is recognized even if there is some corruption to control words so as to prevent system crash in printing. The typical digital front-end trusts the image data arrives at the print head uncorrupted. If image corruption does occur and image artifacts are then created on the print, the system has no means of knowing about the corruption or of determining if the system has a need for maintenance prior to waiting for the printed output being so poor that the operator initiates a call for service.

From the foregoing discussion, it is apparent that there remains a need within the art for a method and apparatus that can maintain printer performance while maintaining exposure control and image integrity wherein data is transmitted in a noisy environment that does cause some corruption and also provide early identification of the need for service or maintenance.

SUMMARY OF THE INVENTION

The foregoing objects are realized by the present invention, which provides an apparatus and method for the transmission of image data and control characters in a noisy environment for use by an electronic writer.

In accordance with a first aspect of the invention there is provided a data transfer system for transmitting and receiving image data and control characters across an interface for output to a printer, the system comprising a transmitter device for transmitting the image data and the control characters across the interface; a receiver device for receiving the image data and the control characters; and a controller for determining whether or not a line of image data has been sufficiently transferred to the receiver device and if determining that the current line of image data has not been sufficiently transferred, the controller provides for output to the printer of a prior sufficiently received line of image data in replacement of the current line of image data so that the prior line of image data is printed at least twice in succession.

In accordance with a second aspect of the invention there is provided a data transfer system for transmitting and receiving image data and control data across an interface subject to noise interference for output to a printer, the system comprising a transmitter device for transmitting the image data and control data in the form of packets across the interface; a receiver device for receiving the image data and control data; and a controller for determining whether or not a number of packets of image data and/or control data have been unsatisfactorily transferred to the receiver device and generating a signal identifying a need for maintenance.

In accordance with a third aspect of the invention there is provided a method for transmitting and receiving image data and control characters across an interface for output to a printer, the method comprising transmitting the image data and the control characters across the interface; receiving the image data and the control characters in a receiver device; and determining whether or not a line of image data has been sufficiently transferred to the receiver device and if determining that the current line of image data has not been sufficiently transferred, the controller provides for output to the printer of a prior sufficiently received line of image data in replacement of the current line of image data so that the prior line of image data is printed at least twice in succession.

In accordance with a fourth aspect of the invention there is provided a method for transmitting and receiving image data and control data across an interface subject to noise interference for output to a printer, the method comprising transmitting the image data and control data in the form of packets across the interface; receiving the image data and control data at a receiver; and determining whether or not a number of packets of image data and/or control data have been unsatisfactorily transferred to the receiver; and generating a signal identifying a need for maintenance.

In accordance with a fifth aspect of the invention there is provided a system for transmitting and receiving image data across an interface for output to a printer, the system comprising means for transmitting the image data across the interface; means for receiving the image data in a receiver device; and means for determining whether or not a line of image data has been sufficiently transferred to the receiver device and if in determining that the current line of image data has not been sufficiently transferred, providing for output to the printer of a prior sufficiently received line of image data in replacement of the current line of image data so that the prior line of image data is printed at least twice in succession.

In accordance with a sixth aspect of the invention there is provided a system for transmitting and receiving image data across an interface subject to noise interference for output to a printer, the system comprising means for transmitting the image data in the form of packets across the interface; means for receiving the image data at a receiver; and means for determining whether or not a number of packets of image data have been unsatisfactorily transferred to the receiver; and means for generating a signal identifying a need for maintenance.

Other objects, advantages, and novel features of the present invention will become more apparent from the following detailed description of the invention when considered in conjunction with the accompanying drawings.

DETAILED DESCRIPTION OF THE INVENTION

The invention will be described with reference to an electrostatographic reproduction apparatus; however, the invention has applicability to any data transfer system for transferring image data to a printer for printing. For example, other types of printing may include printers that expose photographic film, thermal printers, ink jet, etc. Because electrostatographic reproduction apparatus are well known, the present description will be directed in particular to elements forming part of, or cooperating more directly with the present invention. Apparatus not specifically shown or described herein are selectable from those known in the prior art.

Figure 1:
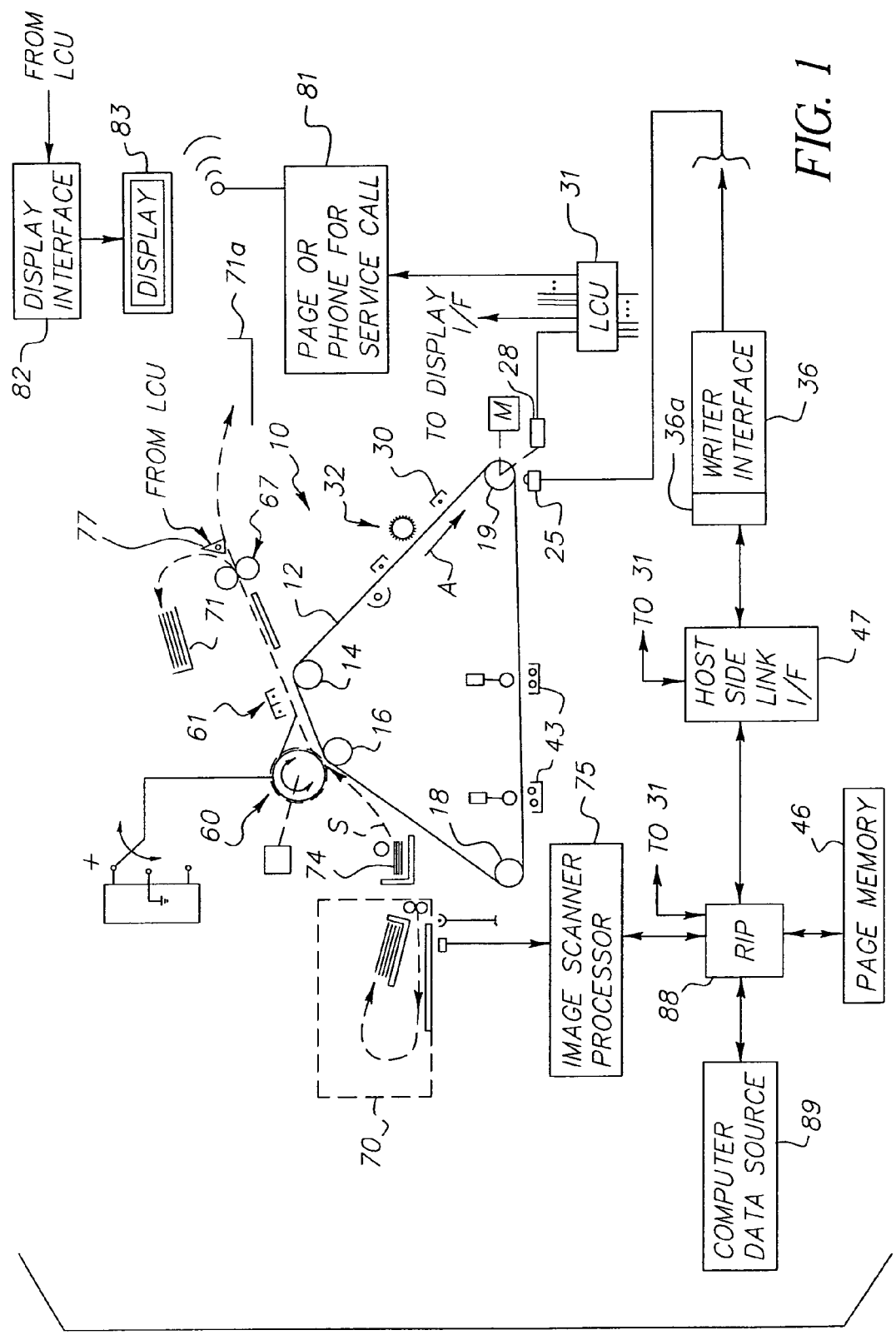
FIG. 1 is an elevation view in schematic of an electrostatographic reproduction apparatus in accordance with the invention.

With reference now to FIG. 1, an electrostatographic reproduction apparatus 10 includes a recording medium or photoreceptor, such as a photoconductive web 12 or other photosensitive medium that is trained about plural transport rollers including rollers 14, 16, 18, and 19, thereby forming an endless or continuous web or belt. Roller 19 is coupled to a drive motor M in a conventional manner. Motor M, is connected to a source of electrical power, when a switch (not shown) is closed by a logic and control unit (LCU) 31. When the motor is energized the roller 19 is driven and moves the web 12 in a clockwise direction as indicated by arrow A. This movement causes successive image areas or image frames of the web 12 to sequentially pass a series of conventional workstations of the reproduction apparatus.

These workstations include charging station 30, in which the photoconductive surface of the web is sensitized by applying to said surface a uniform electrostatic primary charge of a predetermined voltage. At an exposure station 25 an electrostatic image is formed by modulating the primary charge on an image area of the photoconductive surface with selective energization of point-like radiation sources or recording elements such as light-emitting diodes (LEDs) or other light or radiation emitting sources for exposing the recording medium in accordance with signals provided by a data transfer system to be described. The point-like radiation sources are supported in and form a part of a print head. Other radiation sources may include a laser or a charge modulator that is adapted to selectively modulate charge on an insulating surface. The various recording devices are collectively referred to as electronic writers.

One or more development stations 43 include developer of different respective colors for developing the electrostatic images to form visible toned images on the photoconductive surface. In a transfer station 60 the toner image on the web 12 is transferred in register to a copy sheet or receiver S, the toner image thereon being transferred to the copy sheet by electrostatic attraction due to the placement of charge on the backside of the sheet by transfer charger 61. The sheet is then transported to a heated pressure roller fuser 67 where the image is fixed to the copy sheet and the sheet is then transported to a tray 71. The copy sheet S is fed from a supply 74 into engagement with the web 12 in suitable timed relationship. As is well-known, the web may have a plurality of indicia such as perforations along one of its edges which may be used to provide timed control of the various sequences in conjunction with an encoder 28 that senses movement of the web 12 and provides precise timing signals in conjunction with the LCU 31 for control of the various functions of the apparatus 10. Where more than one color is to be formed on the receiver the respective color separation images may be formed on the belt separately and transferred in registration to the receiver as is well known. Alternatively, the different color images may be formed on a single image frame of the belt and transferred to the receiver as is also well known. Also controlled by the LCU 31 is a diverter 77 for determining whether the sheet will be diverted away from the path leading to the exit tray 71 and instead be advanced to a proof tray 71 a or other tray for directing sheets that have been imperfectly produced as will be discussed further below.

With further reference to FIG. 1, image data for creation of reproductions may be provided from a computer data source 89 or a document and/or image scanner 70 shown as examples but other sources may be also provided such as a memory device, network, digital camera, etc. A raster image processor (RIP) 88 may be provided to manipulate the image data so that the image information is suited for printing by a printer. For example, the image data may be subject to half-toning by the RIP. In this regard, reference is made to U.S. Patent Publication No. 2004/0024907, the contents of which are incorporated herein by reference. The output of the RIP 88 may be coupled to or include a page memory 46 for storing one or more pages or frames of processed image data, which acts as a buffer and stores data ready to be downloaded to the electronic writer 25. A host side link interface 47 is provided between the RIP and/or page memory 46 and a writer side interface 36 for synchronizing the transmission of packets of image data and characters that are transmitted from the page memory to the writer interface 36. The writer side interface 36 is provided with various timing elements and buffers and optionally correction control information as will be later described. The invention is also suited for use in a tandem color printer wherein four or more print modules are provided such as disclosed in U.S. Pat. No. 6,608,641, the contents of which are incorporated herein by reference. In such a tandem printer there will be associated with each color station a host side interface and a writer side interface as each color station includes its own electronic writer.

Figure 2:
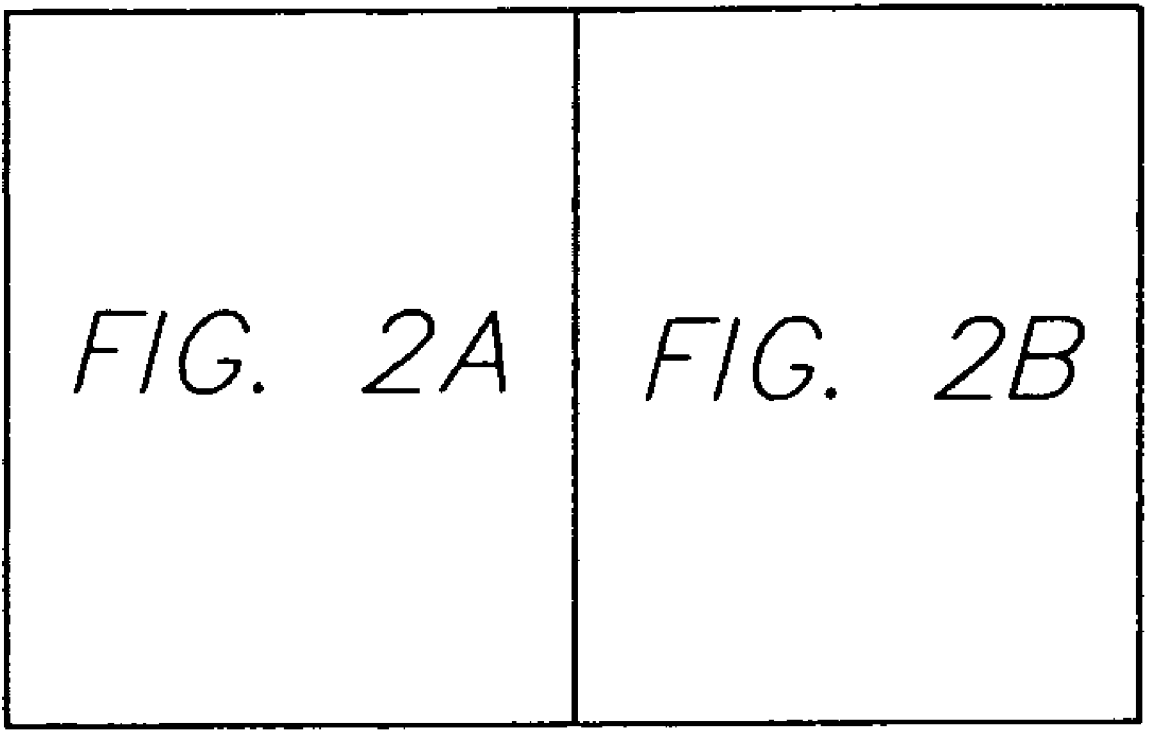
FIG. 2 is a block diagram schematic illustrating a communication interface between a host board serving to provide communication with a writer side interface of an electronic writer forming a part of the apparatus of FIG. 1.
Figure 2A:
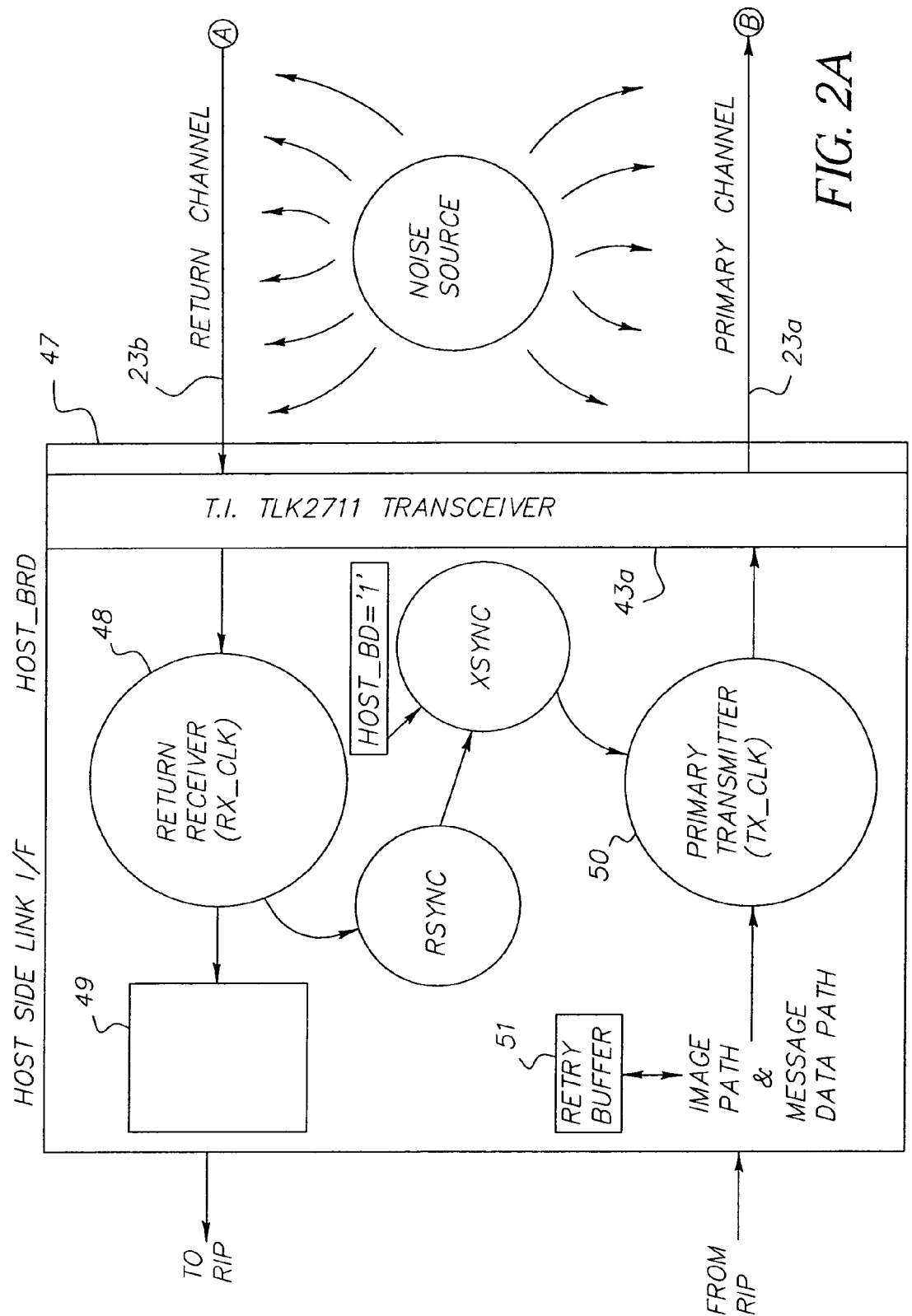
Figure 2B:
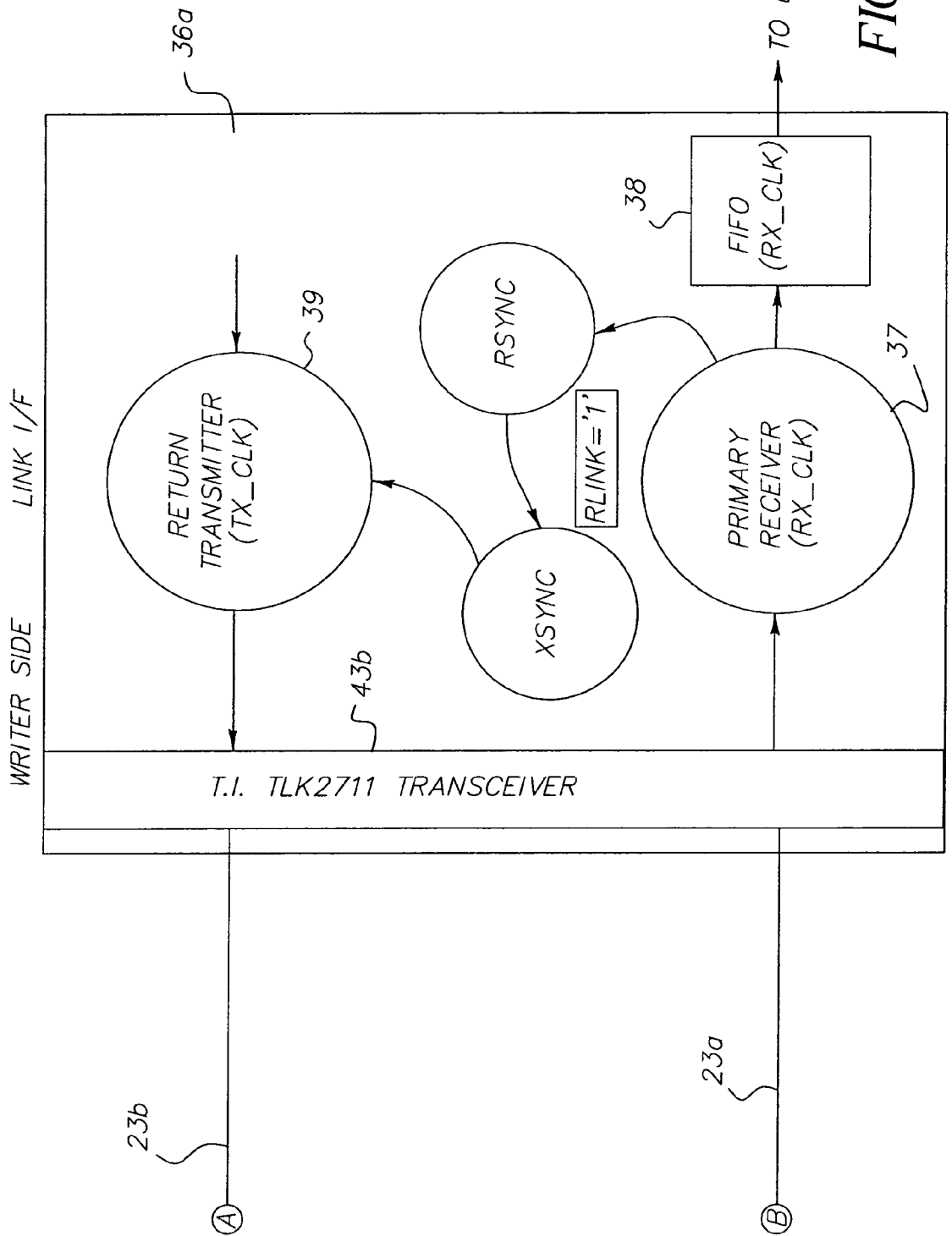

With reference now to FIG. 2, there are illustrated portions of the host side link interface 47 and writer side link interface 36a, which are involved in the transmission of packets of image data and control characters across a high data rate data transfer channel or datalink 23a that passes through a relatively noisy part of the printer apparatus system environment. Specifically, apparatus such as corona chargers and motors tend to generate significant EMI, which has a tendency to impair the integrity of the transmission of data over a high-speed datalink. The transmission portion of the host side link interface 47 includes a primary transmitter 50 that provides input to a transceiver 43a such as a Texas Instruments TLK2711 transceiver. The writer side interface 36 includes a writer side link interface 36a, which includes a similar transceiver 43b for receiving the image data over the primary channel link 23a. The image data is received on the writer side interface side by a primary receiver 37, which outputs received packets of image data to a FIFO 38. The writer side link interface 36a also includes a CRC (cyclic redundancy check) generator to verify if the received packet is good or corrupted. If corrupted, the data in FIFO 38 is deleted and a signal is communicated to the host side link interface through a return channel 23b of a failure of the received packet. The host board of the host side link interface includes digital logic 49 that maintains a count of the number of packet failures per line and per frame. With reference to the flowchart of FIG. 8, if the failed packets per line count or failed packets per frame count exceed a predetermined lower maintenance limit X1, Y1 respectively, the host notifies the system user maintenance is required for the indicated writer. The notification may be via a signal from the LCU 31 (see FIG. 1), which is in communication with the RIP and/or host, to a pager or phone 81 to provide a call for service or to a display interface 82 to communicate with the system user by a message on the system user's display 83 that maintenance is required. The writer can tolerate corrupt data even while it rejects bad data packets and tells the host via the return channel 23b to retransmit the packet of data and thus is still able to maintain image integrity. However if the failed packets per line exceeds an upper limit, X2 (for example 10% of the line packets), determined to mean there is not enough time to retransmit the corrupted data, the current uncompleted line is deleted and the last good image line is reprinted in its place. Also if the failed packets per frame exceeds an upper limit, Y2, determined to mean there have been too many failed lines, printing of the current printed page is ended and the receiver is output to the proof tray by automatic positioning of the diverter to cause the sheet to be directed to the proof tray 71a. The apparatus may be automatically programmed to then generate a signal indicating the need for maintenance and such signal and programming may cause the apparatus to perform a maintenance operation such as cleaning of its corona wires or other maintenance or repair operation and/or notifying an operator or user or service person that maintenance is required.

Referring again to FIG. 2, in response to receipt of the packet of image data by the primary receiver 37, a sync signal is generated and used to return an acknowledgment signal via a return transmitter 39 over a return channel 23b to a return receiver 48. The return acknowledgment will indicate if good or corrupt data arrived at the writer side interface and is stored in the digital logic 49. The return acknowledgment, if indicated good, will trigger the next packet of image data or control characters from the primary transmitter 50 over the primary channel 23a to the receiving side. If the return acknowledgment indicates corrupt data arrived at the writer side interface, then the same data is retransmitted again. In this regard a retry buffer 51 is provided on the host side, which stores the last image data packet or control character packet that is transmitted. When the return acknowledgment indicates corrupt data arrived at the writer side interface, then this data packet or control character packet is retransmitted from the retry buffer 51 via the primary transmitter 50 and transceiver 43a to the primary channel 23a to writer side link interface 36a.

Figure 3:
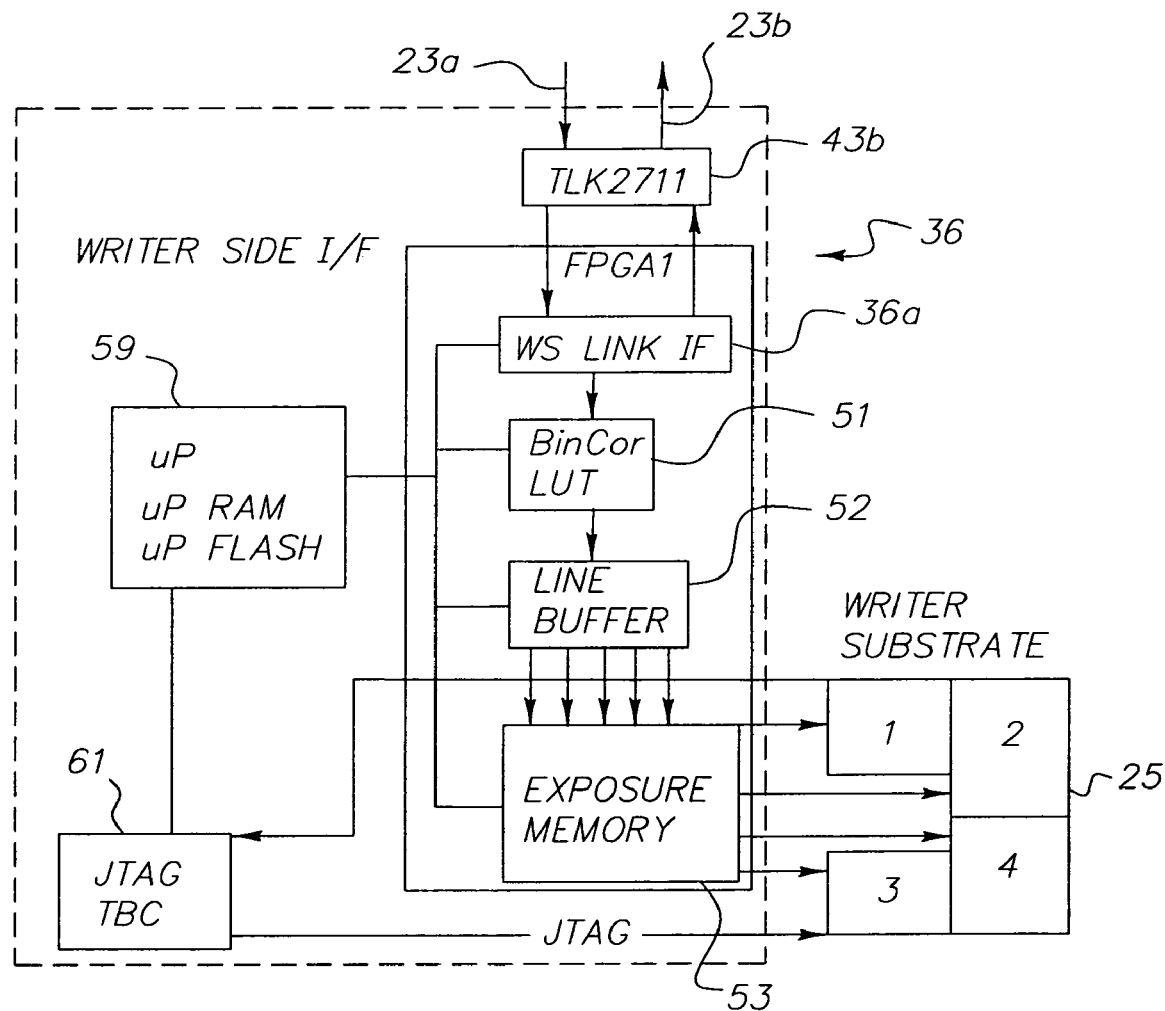
FIG. 3 is a block diagram schematic illustrating a portion of a writer side interface for the electronic writer.

With reference to FIG. 3, the writer side interface 36 includes, in addition to the writer side link interface 36a, multiple bin correction lookup tables (LUT) 51, which are used to modify the image data representing a density signal for uniformity correction in the case of using a series of recording elements such as LEDs wherein there may be non-uniformity between the LEDs. As the photoconductor or LEDs age, it is possible to activate a different correction table after so much time in service has elapsed thereby extending the useable life of these components. The output of the LUT 51 is stored in a line buffer 52, which stores multiple lines of corrected image data to provide for data that may be rapidly output to the recording elements of the print head 25 for recording a line of image data at a time. Prior to being sent to the print head, the corrected image data may be input to an exposure memory 53 to be further modified to adjust for exposure as may be required to provide writer exposure control signals. The exposure control signals that cause a line of image data to be recorded need not be coincident with the image data currently being transmitted over the primary channel 23a. As long as a line of corrected image data exists in the line buffer 52, it can be called out by sending a print signal. The writer side interface 36 also includes a microprocessor control 59 for controlling the synchronization of the various elements of the writer side interface. Optionally there also may be provided test circuitry, such as a JTAG test device 61, for periodically determining operability and/or connectivity of the various elements of the writer.

Figure 4:
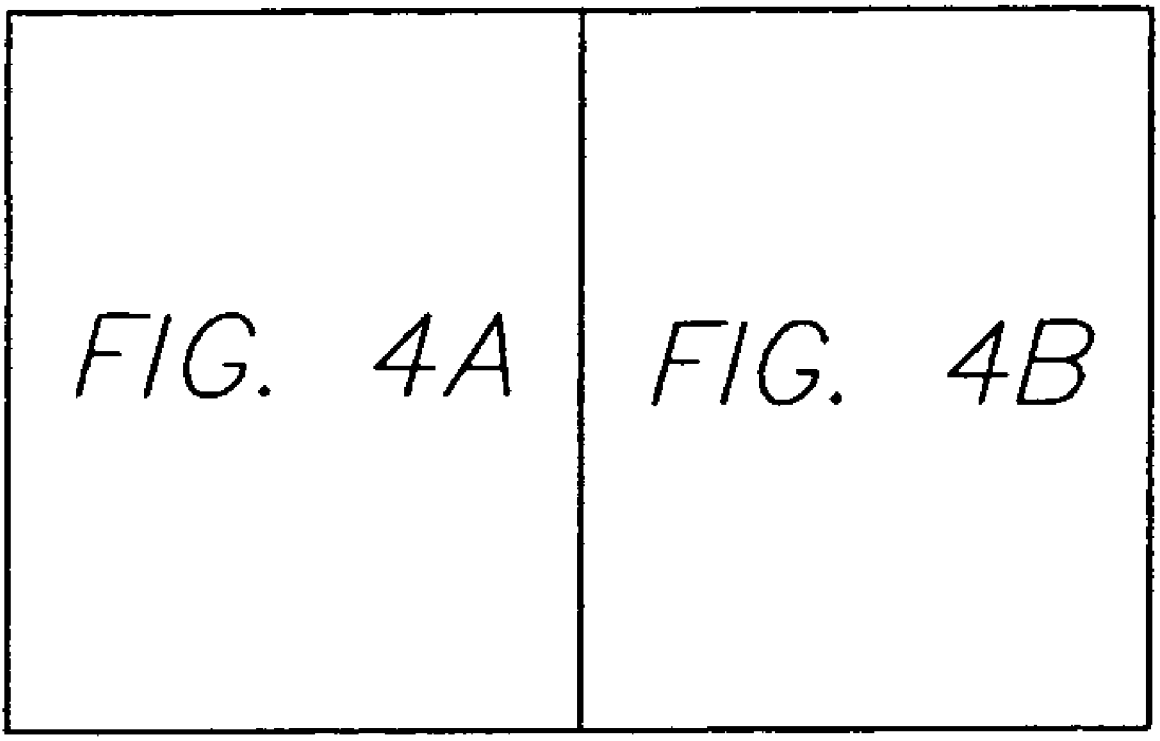
FIG. 4 is a diagram illustrating steps in the transmission of information between the host board and the writer side interface of FIG. 2.
Figure 4A:
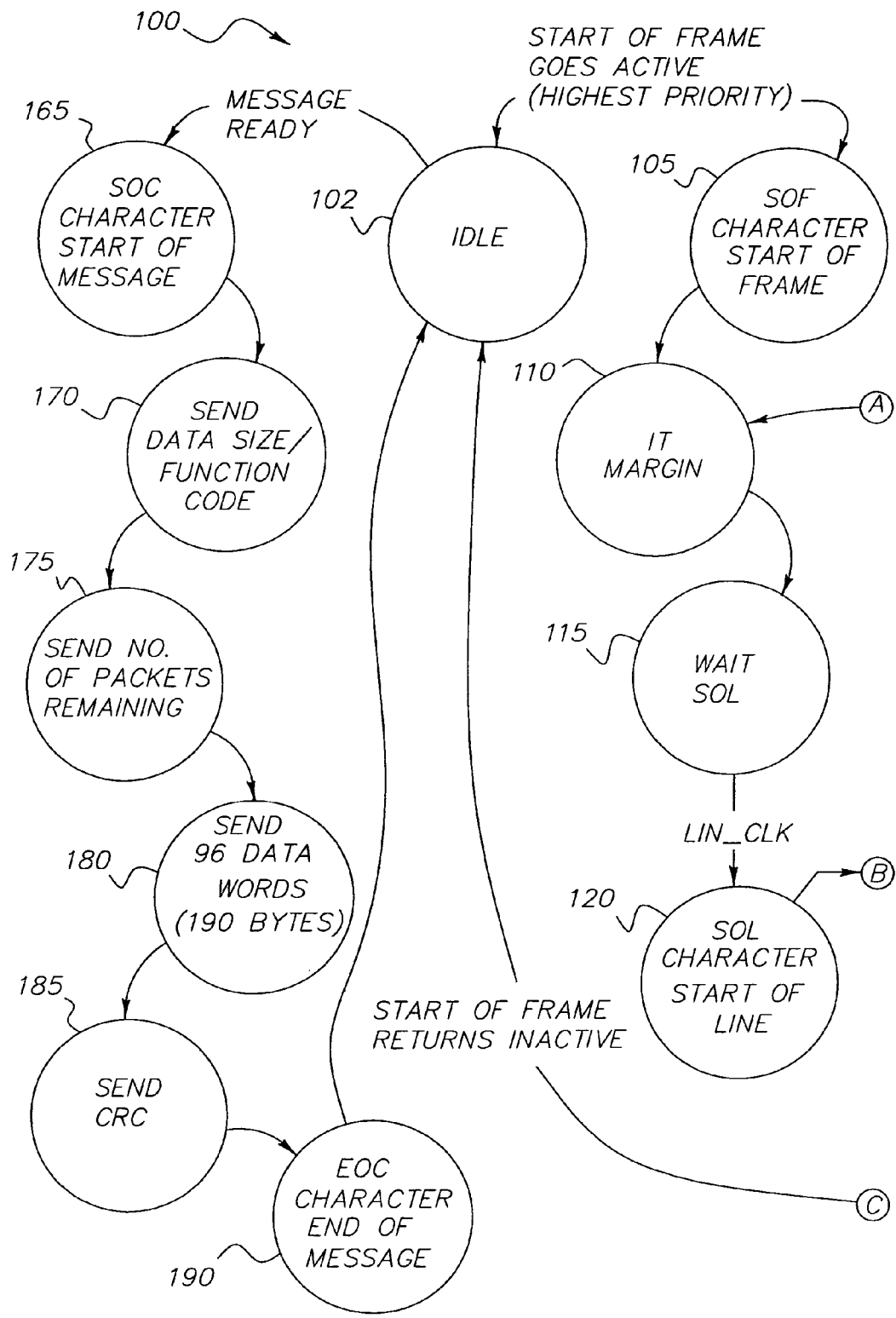
Figure 4B:
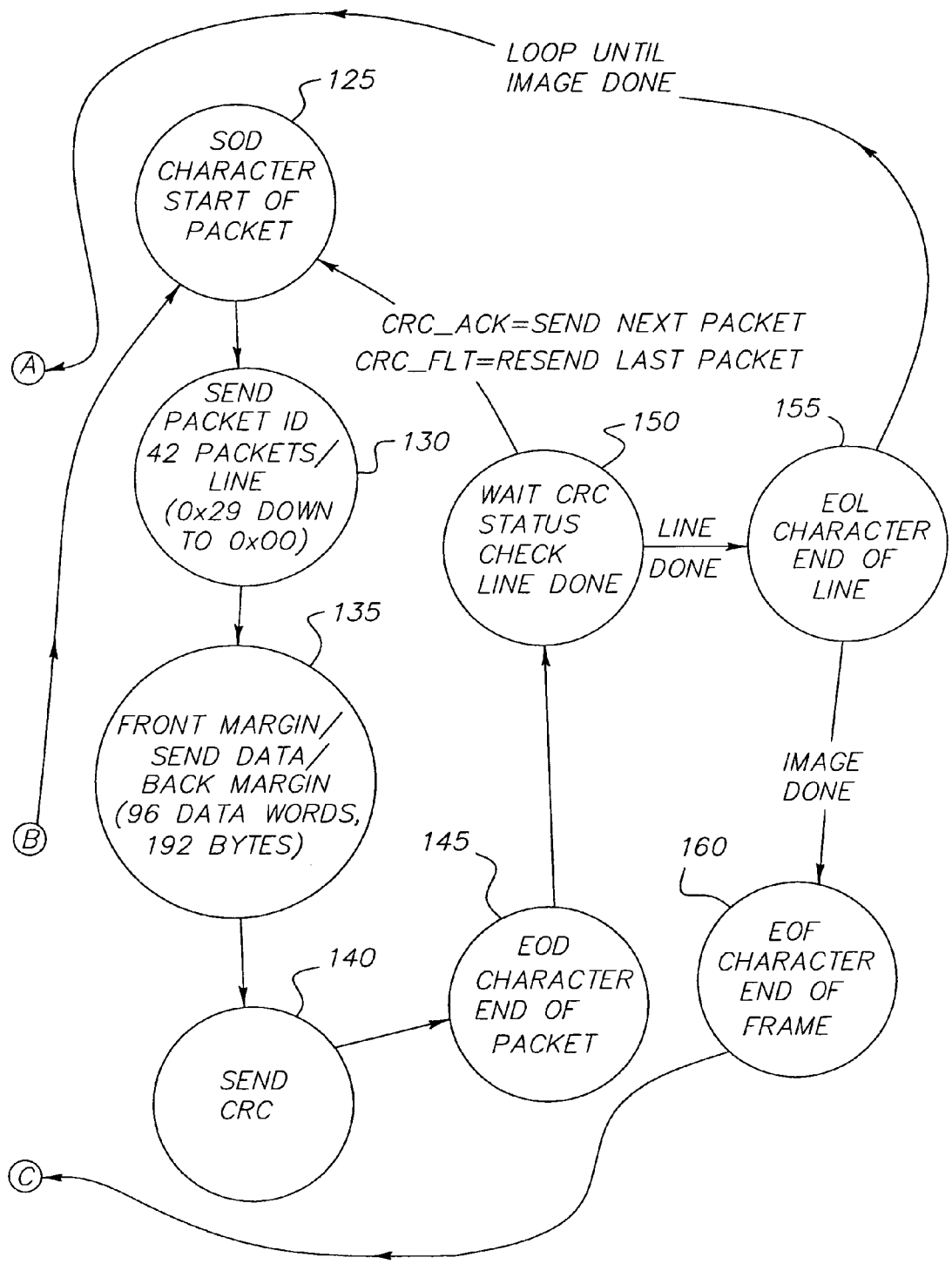
Figure 5:
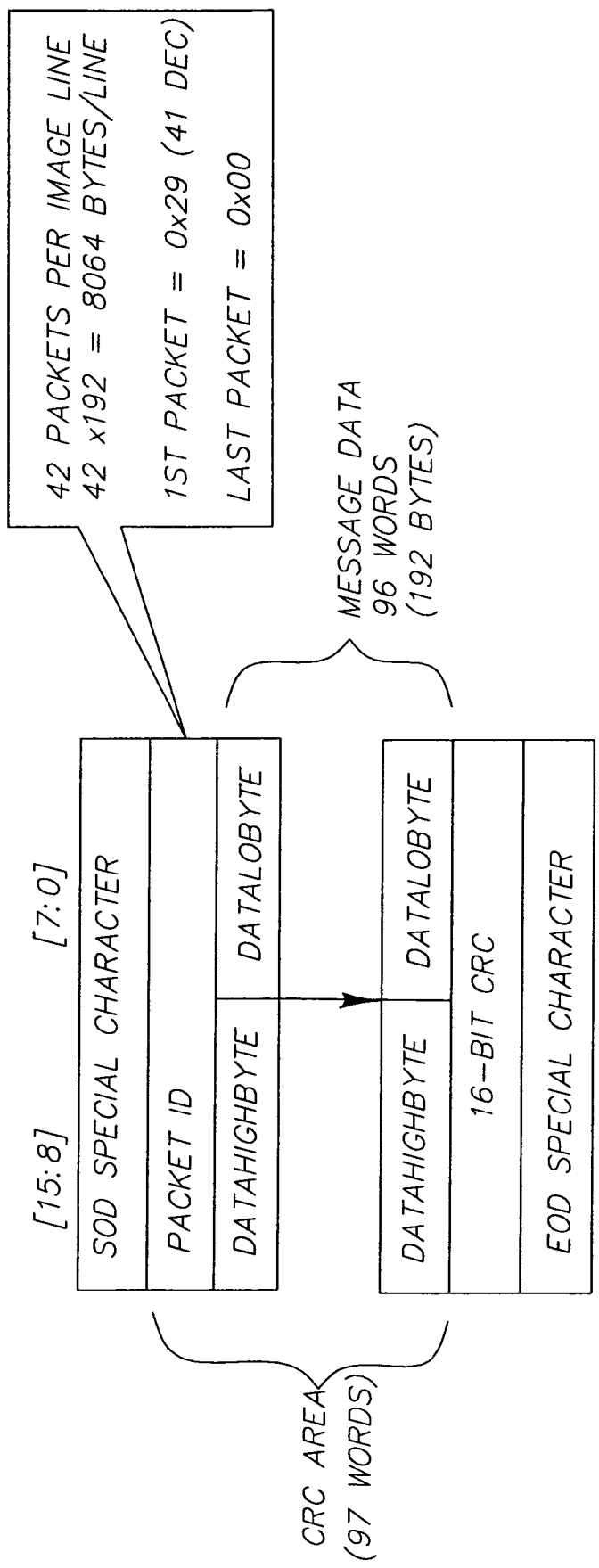
FIG. 5 is a diagram illustrating schematically contents of information used to accompany an image data packet transmitted between the host board and the writer side interface.

With reference to FIG. 4, there is illustrated a flowchart 100 illustrating a sequence of transmission of a line of image data across the primary channel 23a. Starting with the condition of idle 102, a start of frame (SOF) goes active and a start of frame character is generated by the print engine and transmitted across the primary channel, step 105. A character is then generated identifying an image top margin, step 110. In step 115 idle sync characters are transmitted until the start of line character (SOL) is ready to be transmitted. In step 120 a start of line character is transmitted for the first line of image data. In step 125 a start of data character (SOD) is generated which precedes the transmission of each data packet. In step 130 a character is generated providing a packet identification such as the packet number within the line, an example of which for the case of 42 packets per line would provide a packet count number of decimal 41 which count is then decremented by one each time a new packet for the line is transmitted. In step 130 image data for the line is sent in packets of data of say 96×16 bits. In step 135 it will be noted that there is also provided a character related to the size of the front margin of the line and a character related to the back margin of the line for use in the writer side providing pseudo image data to the writer that will identify pixels at the margins which are not to be recorded. In response to each uncorrupted data packet transmitted across the primary channel 23a, a CRC acknowledgment character is generated by a CRC generator on the writer side link interface 36a and communicated over the return channel 23b to the host board 47, step 140. The transmission of each data packet concludes with an end of data (EOD) character signifying the end of the packet, step 145 and see also FIG. 5. Thereafter, in step 150, an idle period is established and a determination is made as to whether or not the CRC acknowledgment (CRC_ACK) has been provided for this packet and a check made as to whether or not the line is done. If the line is not yet done and further data packets are to be transmitted for this line, the process loops back to step 125. In the event that any packet has been corrupted, the writer side generates an indication of such with a signal CRC_FLT indicating a faulty transmission and initiating a resending of the packet which was simultaneously stored in the retry buffer 51 during transmission from the host board to the writer side. The process repeats for each of the lines of image data on the frame or page with an end of line (EOL) character being transmitted for identifying the end of each line, step 155. When all of the lines of image data to be printed have been transmitted across the primary channel 23*a*, an end of frame (EOF) character is generated in step 160 and the host interface goes into the idle state, step 102, to wait for the next frame or page that is ready to be transmitted over the channel 23*a* for printing. It will be understood that the start of frame when active indicates that the printer is being prepared to print a new image frame and that such takes priority over the transmission of non-image data messages between the host side and the writer side. However, as indicated in steps 165-190, provision is made for transmission of non-image data messages when the start of frame is not active. In the process of transmitting line by line of image data, each last successfully-transmitted line is temporarily stored in a line buffer memory 52 on the writer side, for the purpose of reprinting that line when a line is lost due to more than correctable corruptness.

Figure 6:
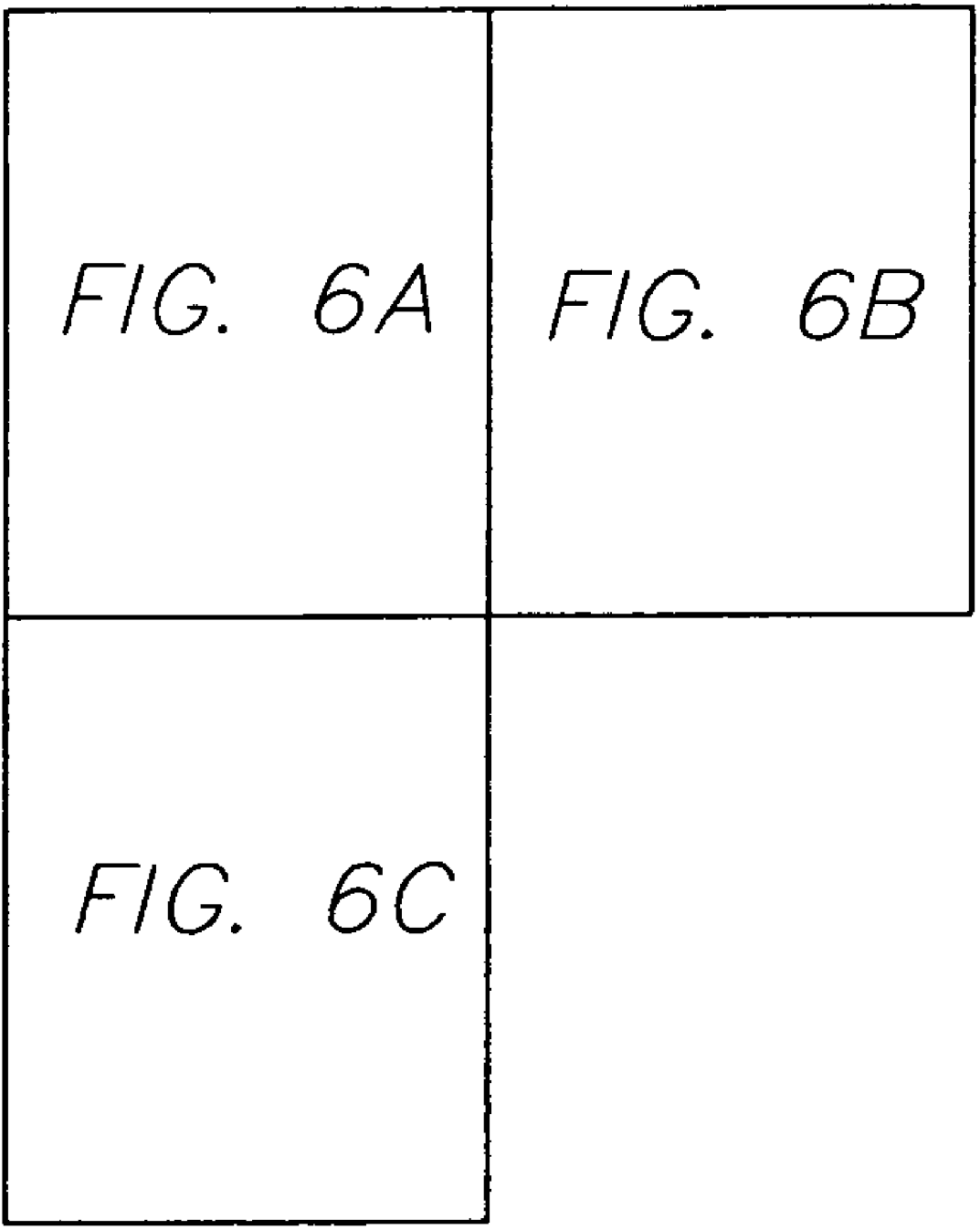
FIG. 6 is a flowchart in accordance with the invention illustrating operation of the control of communications with the electronic writer to accommodate for corruption of data communicated to the writer due to passage of information through a noisy environment.
Figure 6A:
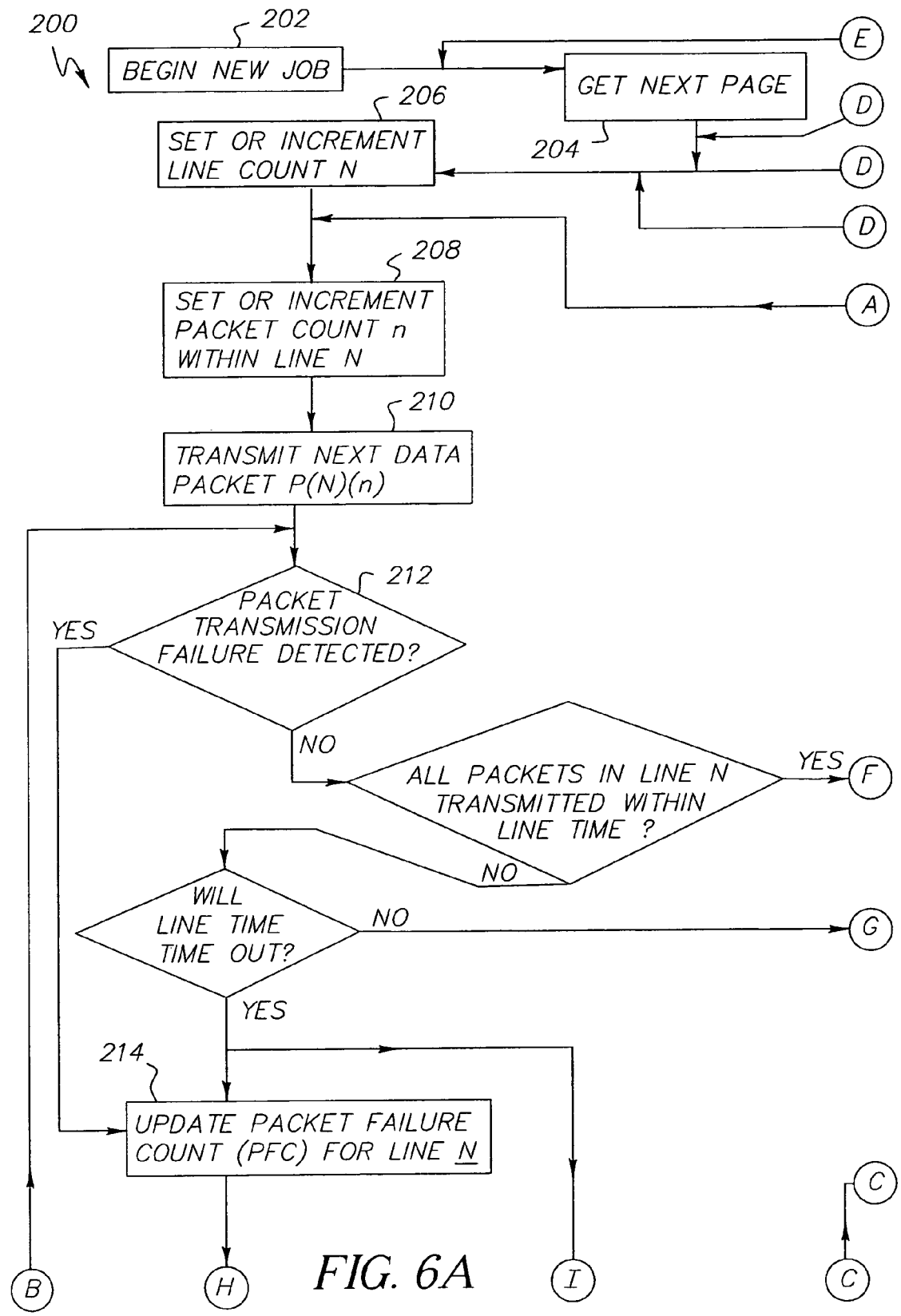
Figure 6B:
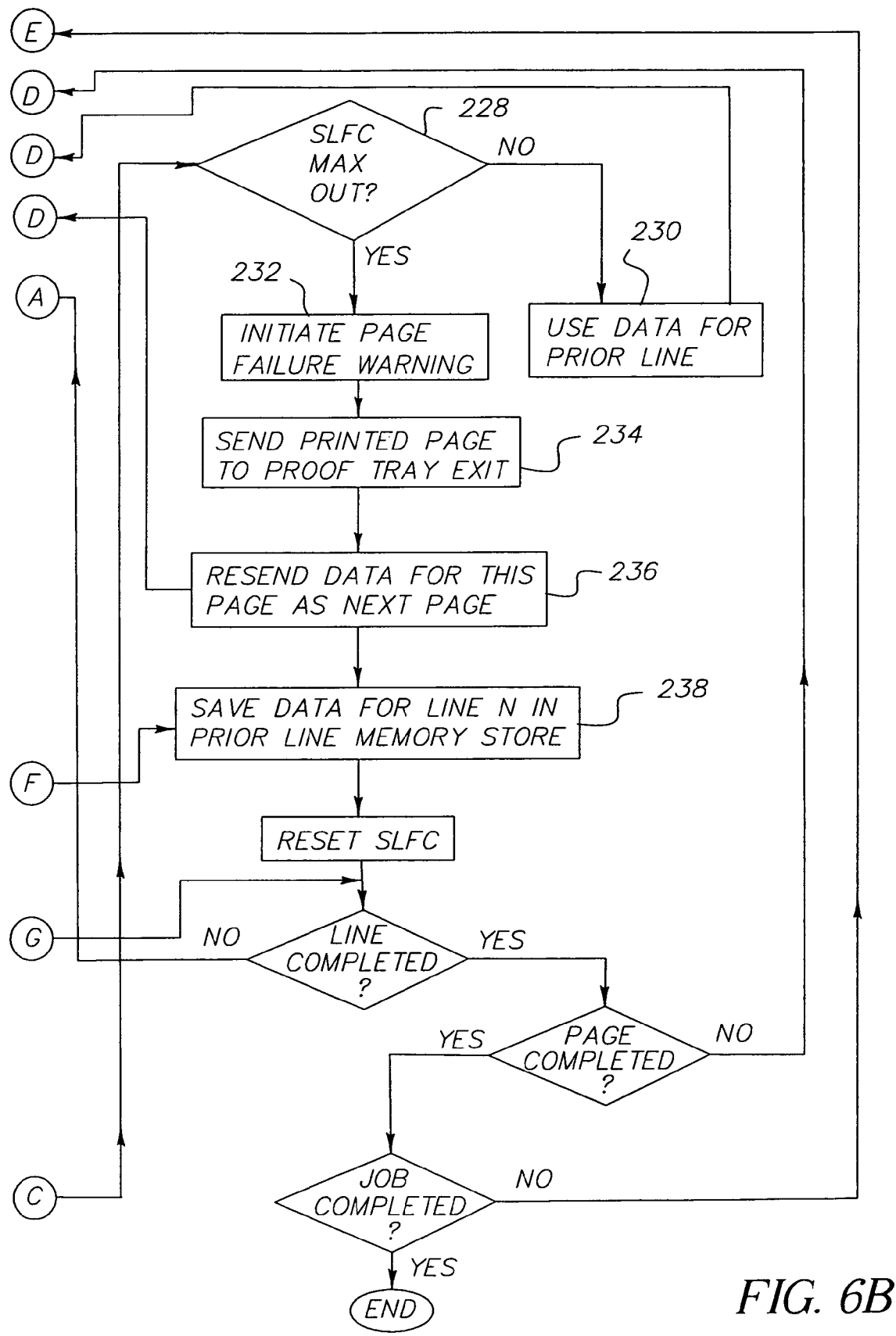
Figure 6C:
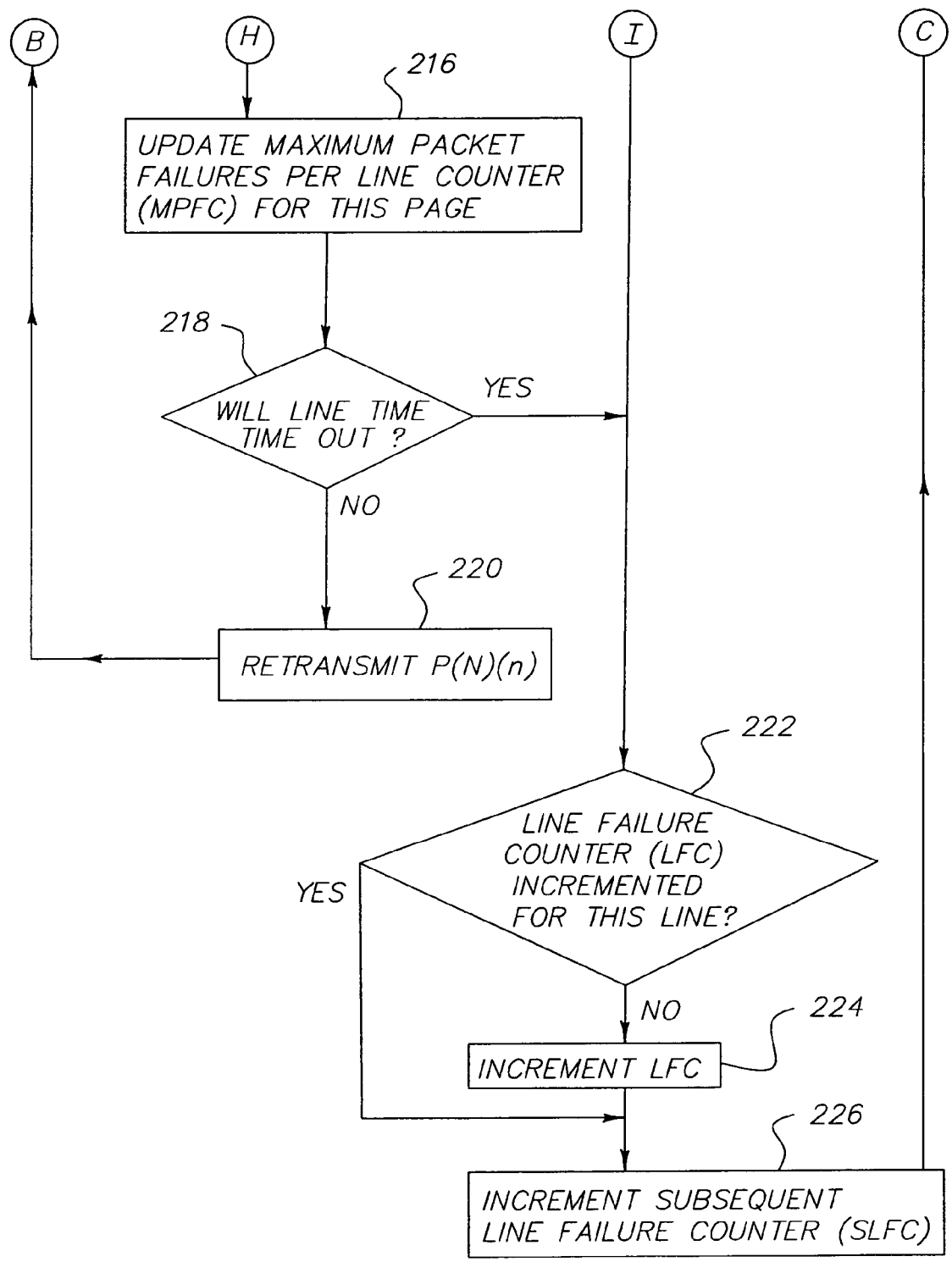

With reference now to the flowchart 200 of FIG. 6, a new job is begun, step 202, and a new page of image data is to be transmitted from the host side link interface 47 to the writer side link interface 36*a* through the primary channel 23*a*, as indicated above, and which requires transmission through a noisy environment. Identification of a line count representing the number of lines to be transmitted may be stored on the writer side, step 206. As indicated in the flowchart 100, the data packets each include identification of a packet count within a line, step 208. With the transmission of each packet of image data, a determination is made as to whether or not the transmission failed, step 212. Since the steps for successful transmission have been discussed above, the discussion below will be with regard to situations of unsuccessful transmission. In the event that a packet transmission failure has been detected, a counter forming a part of the logic and control unit receives a signal to update the packet failure count (PFC) for the particular line N, step 214. Packet failures for a line are counted to determine if there is sufficient time for transmission of the remainder of the packets in the line. Additionally, packet failures for a line are counted to determine whether or not a call for maintenance is to be generated as will be discussed below. In addition to counting the number of packet failures for line N there is also maintained a count of maximum packet failures per line (MPFC) to determine trend as to whether or not the packet failure count is increasing, step 216. The update of the MPFC regarding line N is done when the line time times out or when a determination is made that the line time will timeout.

When a packet failure transmission is encountered, as noted above, the packet is retransmitted from the retry buffer 51. However, prior to doing this, a determination is made in step 218 as to whether or not retransmission of the packet P(N)(n) is necessary since the time available for transmission of the remainder of the packets for this line may be insufficient. As an example, the time available for transmission of all the 42 packets in one line might only allow for no more then 10% transmission errors. If it is determined in step 218 that there will be sufficient time to transmit the remainder of the packets in the line, the packet P(N)(n) is transmitted, step 220. If there is insufficient time for transmission of the remainder of the packets in the line N, a line failure counter (LFC) is incremented, steps 222 and 224 which maintains a count of the number of lines of this frame which have failed to be transmitted over the primary channel 23*a*. As will be noted later this count may be used to determine whether or not maintenance is needed.

With regard to any particular line N that fails to be transmitted, the printer provides for reprinting of a prior adjacent Line (N−1) in its place. As noted above a buffer memory 52 is provided on the writer side for storing one or more lines of image data waiting to be printed for this image frame. Once a line of image data is sent to the printer for printing, the data for this line remains stored in the buffer memory 52 on the writer side, step 238. However, since the particular line N and lines subsequent thereto (lines N+1,N+2) may fail to be transmitted the process provides for counting the number of times of successive line transmission failures and thus the number of times in which line N−1 is successively printed in lieu of following lines N,N+1,N+2. It will be noted that a failure to properly transmit line N does not provide for the attempted retransmission of line N over primary channel 23*a* but rather instead the transmission of the next succeeding line N+1. This count is referred to as the subsequent line failure counter (SLFC), step 226. In step 228 a determination is made as to whether or not the SLFC count has maxed out. For example, the process may provide for printing a prior line no more than three additional times. Such would be the case where line N−1 is printed in lieu of lines N,N+1 and N+2 wherein each of the lines N,N+1 and N+2 failed to be satisfactorily transmitted. In this regard an assumption is made that a satisfactory image may still be printed even though a line of data is repeatedly printed a minimal number of times in substitution for a series of a minimal number of succeeding lines which fail to be satisfactorily transmitted. In the event that the SLFC has not maxed out, the data for the prior line N−1 is sent to be printed again, step 230. After a second printing of line N−1 the next succeeding line, line N+1, is attempted to be transmitted, data packet by data packet, over the primary channel 23*a*.

With regard also to FIG. 1 and the flowchart of FIG. 6, in the event that the SLFC has maxed out, which implies that it was necessary to print line N−1 repeatedly and for more than a minimal number of times due to failure to satisfactorily transmit a predetermined number of successive subsequent lines, a page failure warning may be initiated, step 232. A message indicating such warning is thus displayed to the operator on the display 83 through a signal provided by the LCU 31 via the display interface 82. In addition, a pager or phone call may be initiated by a signal from the LCU to an appropriate transmitter 81 to indicate the warning. The partially printed page is then forwarded to a proof tray exit 71 *a* instead of the exit tray 71 to which only successful printings are forwarded by adjustment of the diverter 77 in response to a signal from the LCU 31. The LCU may be programmed to initiate a service operation such as automatic cleaning of the corona wires of the primary and/or other corona chargers.

Figure 7:
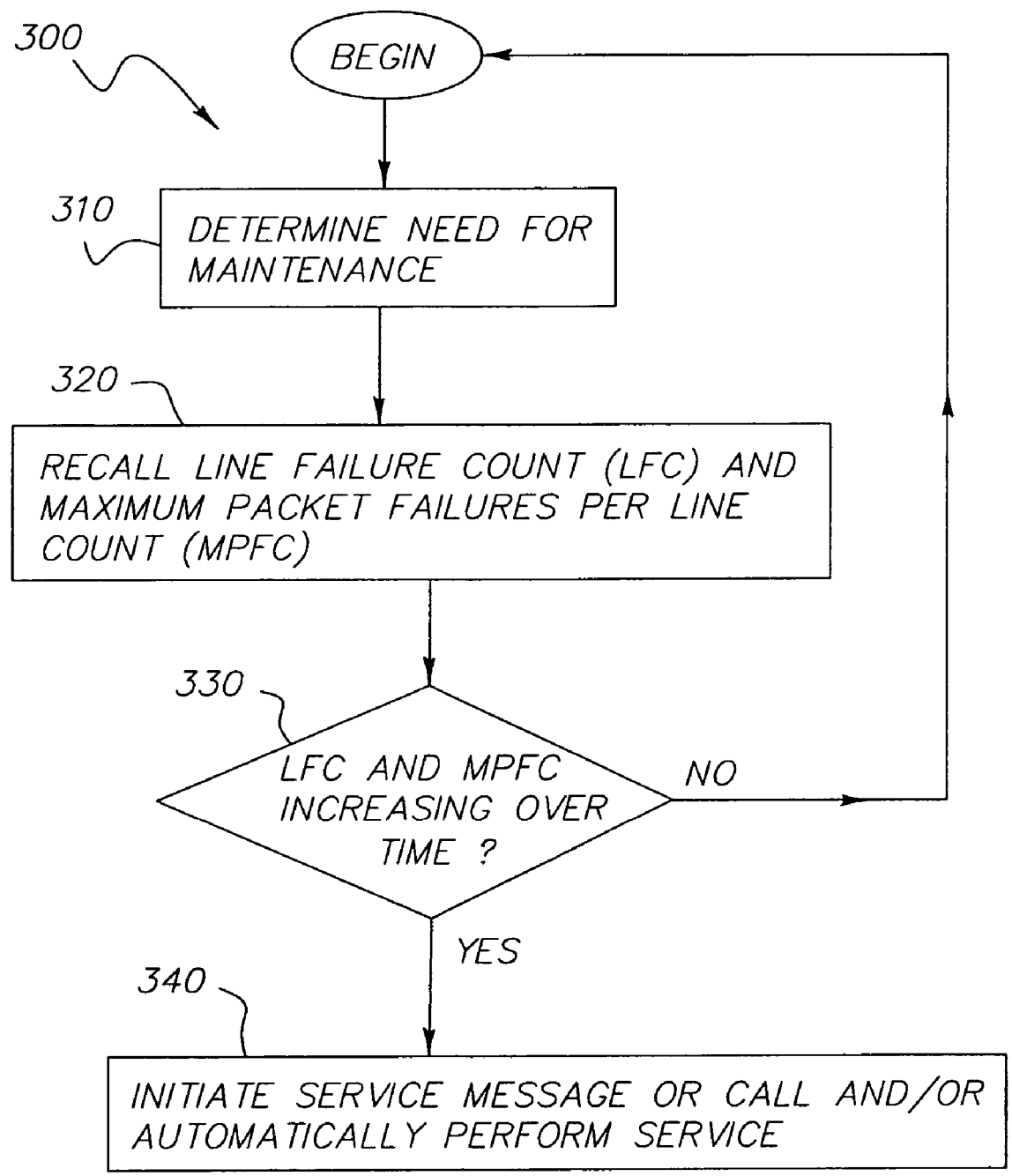
FIG. 7 is a flowchart illustrating a process for notifying a system user that maintenance is required in accordance with the method and apparatus of the invention.

In certain situations the SLFC may not have maxed out, yet it may be desirable to initiate a service message or call and/or automatically perform service. In this regard and with reference to the flowchart 300 of FIG. 7, a determination of the need for maintenance, step 310, may be made by examining the line failure count and maximum packet failures per line count and determining if both are increasing over time, steps 320 and 330. If both the line failure count and maximum packet failures per line count are increasing over time, this may be used as a criterion for determining as to whether or not to initiate a service message or call and/or automatically perform service, step 340. The above are examples of types of criteria for use in determining as to whether or not to initiate or identify the need for service still other criteria may be used in accordance with the teachings herein.

Figure 8:
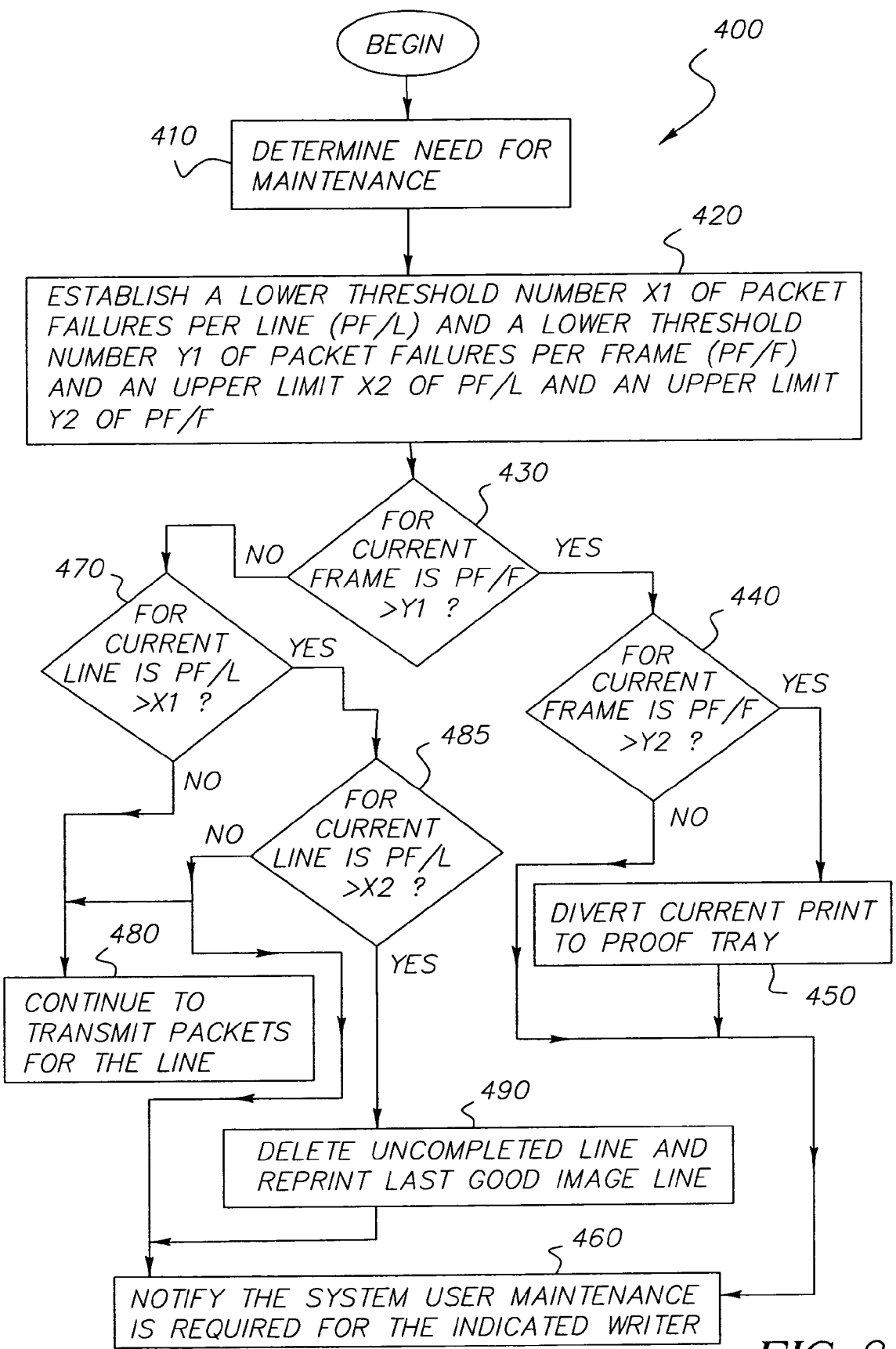
FIG. 8 is a flowchart illustrating an alternate embodiment of a process for notifying a system user that maintenance is required in accordance with the method and apparatus of the invention.

In yet another embodiment of the invention and with reference to the flowchart 400 of FIG. 8, a routine regarding a determination for a need for maintenance is made in step 410 regarding the printing of the current receiver. In this routine, a lower threshold number X1 of packet failures per line, a lower threshold number Y1 of packet failures per frame, an upper limit X2 of packet failures per line and an upper limit Y2 of packet failures per frame are established, step 420. In step 430 a determination is made as to whether or not for the current frame the lower threshold number Y1 of packet failures per frame has been exceeded. If this lower threshold has been exceeded then a determination is made if the upper threshold Y2 of packet failures per frame has also been exceeded, step 440. If this upper threshold has been exceeded then printing of the current receiver is terminated and the receiver is diverted to the proof tray, step 450. The user is notified that the system requires maintenance and/or an automatic maintenance operation is performed, step 460. If in step 440 the upper limit of packet failures per frame Y2 has not been exceeded, but the lower level of packet failures per frame Y1 has been exceeded, then printing of the current receiver continues but the system user is notified of the need for maintenance and/or the automatic maintenance operation is performed when convenient, step 460. If in step 430 for the current frame, the number of packet failures per frame has not exceeded the lower threshold limit Y1 then a determination is made with regard for the current line being transmitted over the noisy interface as to whether or not the number of packet failures per line is greater than the lower threshold X1, step 470. If this lower threshold of packet failures per line has been exceeded, a determination is made in step 485 as to whether or not for the current line being transmitted the number of packet failures per line has also exceeded the upper threshold X2. If this upper threshold of packet failures per line has not been exceeded than the system continues to transmit packets of data and control signals for the line for printing, step 480. In addition since the lower threshold limit of packet failures per line has been exceeded, the system user is notified that maintenance is required and/or an automatic maintenance operation may be performed after printing the data for this page or when convenient. In the event that for the current line being transmitted over the noisy interface that the number of packet failures per line is greater than the upper threshold X2 then it is assumed that printing of this line cannot be made and the data for this line is erased from the buffer on the writer side and the image data for the previous line that was printed and which is stored in a buffer on the writer side is sent to the writer for printing another time, step 490.

The invention thus provides for the transmission of information to a writer over an interface that is subject to noise and which accommodates for various failures. A count is maintained of packet failures within a line of image data to determine whether or not sufficient time remains for transmission of that line. This count of failures in the line transmission may also be used to determine whether or not maintenance should be requested and/or automatically performed by the apparatus if so equipped. A retry buffer on the host side stores the data packet being currently transmitted. If there is failure of transmission of this packet, the retransmission thereof is easily accomplished by recalling the data from the retry buffer. The apparatus and method of the invention further provide for a count representing the maximum number of packet failures within a line that has been achieved for this image frame or job or over a predetermined time to assess whether or not this maximum number seems to be increasing and is therefore an indicator that maintenance is probably required. Still further, the method and apparatus of the invention provide for repetitive printing of a successfully transmitted line of image data in substitution for a minimal number of succeeding lines that fail to be successfully transmitted across the interface that is subject to a noisy environment. The invention thus provides a method and apparatus that can maintain printer performance while maintaining exposure control and image integrity wherein data is transmitted in a noisy environment that does cause some corruption. Furthermore, the method and apparatus of the invention provide for early identification of the need for service or maintenance.

The invention has been described with reference to the preferred embodiments. Obviously, modifications and alternatives will occur to others upon reading the preceding detailed description. It is intended therefore that the invention be construed as including all such modifications and alternatives in so far as they come within the scope of the appended claims or the equivalents thereof.

The invention claimed is:

1. A data transfer system for transmitting and receiving image data and control characters across an interface for output to a printer, the system comprising:
   a transmitter device for transmitting image data, in packets bits being of a packet size less than a line of image data, and control characters along a 16-bit CRC value for each packet across an interface;
   a receiver device for receiving transmitted image data and control characters; and
   a controller for determining, at a bit level, whether or not a packet of image data has been sufficiently transferred to said receiver device and if determining that the current packet of image data bits has not been sufficiently transferred, said controller provides for output to the printer of a prior sufficiently received line of image data in replacement of the current packet of image data so that the prior line of sufficiently received image data is printed at least twice in succession the controller is programmed to provide a determination related to increases over time of failures to sufficiently transmit lines and/or packets of image data across the interface of the need for maintenance and provides a signal related to such need, and a display for indicating the need for a service call or maintenance in response to said signal.

2. The system of claim 1, wherein said transmitter device includes a first counter that provides a first count of the number of failures in transmission of packets per line.

3. The system of claim 2, wherein said transmitter device includes a device which is operative to provide a determination that the transmission time for the packet will be insufficient for transmission of the packet of image data.

4. The system of claim 1, wherein a count is provided in a counter of the number of successive times that the prior sufficiently received packet of image data has been selected for printing in replacement of repeated failures to sufficiently transmit subsequent packets of image data, and the controller is programmed to provide a signal to abort further printing of the page when the count equals or exceeds a predetermined number.

5. The system of claim 1, including a telephone or internet connection for providing a service call in response to said signal.

6. A data transfer system for transmitting and receiving image data and control data across an interface subject to noise interference for output to a printer, the system comprising:

a transmitter device for transmitting image data, in packets bits being of a packet size less than a line of image data and control data in the form of packets across an interface;

a receiver device for receiving transmitted image data and control data; and a controller for determining at a bit level the number of packets of image data and/or control data with regard to a single line, and whether or not a number of packets of image data and/or control data have been unsatisfactorily transferred to said receiver device due to noise interference, and generating a signal identifying a need for maintenance to fix the root cause of the noise interference, wherein the controller determines the number of packets of image data and/or control data that have not satisfactorily transferred with regard to an image frame, and the controller determines that if such number is greater than a predetermined number that a signal is to be generated identifying the need for maintenance.

7. The data transfer system of claim 6, wherein the controller determines the number of packets of image data and/or control data with regard to an image frame.

8. The data transfer system of claim 6, wherein the controller maintains a count of maximum packet failures per line and, if this count is increasing over time, generates a signal identifying a need for maintenance.

9. The data transfer system of claim 8, wherein the controller maintains a count of line failures within an image frame and, if this count is increasing with time, generates a signal identifying a need for maintenance.

10. The data transfer system of claim 6, wherein the controller maintains a count of line failures within an image frame and, if the number is increasing with time, generates a signal identifying a need for maintenance.

11. A method for transmitting and receiving image data and control characters across an interface for output to a printer, the method comprising:

transmitting image data, in packets bits being of a packet size less than a line of image data, and control characters along a 16-bit CRC value for each packet across an interface;

receiving the transmitted image data and control characters in a receiver device;

determining, at a bit level, whether or not a packet of image data has been sufficiently transferred to the receiver device and, if determining that the current packet of image data has not been sufficiently transferred, providing for output to the printer of a prior sufficiently received packet of image data in replacement of the current packet of image data so that the prior packet of sufficiently received image data is printed at least twice in succession;

making a determination related to increases over time of failures to sufficiently transmit packets of image data across the interface;

in response to the last mentioned determining step, generating a signal of the need for maintenance; and providing a service call in response to said signal.

12. The method of claim 11, wherein said image data to include a first count of the number of failures in transmission of packets per line.

13. The method of claim 12, wherein a determination is made that the transmission time for the packet will be insufficient for transmission of the packet of image data.

14. The method of claim 11, wherein a count is provided of the number of successive times that the prior sufficiently received packet of image data has been selected for printing in replacement of repeated failures to sufficiently transmit subsequent packets of image data, and there is generated a signal to abort further printing of the page when the count equals or exceeds a predetermined number.

15. The method of claim 11, wherein a display indicates the need for a service call or maintenance in response to said signal.

16. A method for transmitting and receiving image data and control data across an interface subject to noise interference for output to a printer, the method comprising:

transmitting image data and control data in the form of packets, the image data in packet bits being of a packet size less than a line of image data and the control characters along a 16-bit CRC value in each packet across the interface;

receiving the transmitted image data and control data at a receiver;

determining whether or not a number of packets of image data and/or control data have been unsatisfactorily transferred to the receiver due to noise interference; and generating a signal identifying a need for maintenance to fix the root cause of the noise interference; and providing for the fixing of the identified root cause of the noise interference.

17. The data method of claim 16, wherein the number of packets of image data and/or control data is determined with regard to a single line.

18. The method of claim 17, wherein a determination is also made of the number of packets of image data and/or control data that have not been satisfactorily transferred with regard to an image frame and, if the number is greater than a predetermined number, generating a signal identifying a need for maintenance.

19. The method of claim 16, wherein the number of packets of image data and/or control data is determined with regard to an image frame.

20. The method of claim 16, wherein the number represents a count of maximum packet failures per line and, if this count is increasing over time, generating a signal identifying a need for maintenance.

21. The method of claim 16, wherein there is maintained a count of line failures within an image frame that have been unsatisfactorily transmitted and, if the count is increasing with time, a signal is generated identifying a need for maintenance.

22. The method of claim 16, wherein there is maintained a count of line failures within an image frame that have been unsatisfactorily transmitted and, if the number is increasing with time, generates a signal identifying a need for maintenance.

* * * * *